(12) United States Patent
Wenger et al.

(10) Patent No.: US 7,987,774 B2
(45) Date of Patent: *Aug. 2, 2011

(54) COOKING EXTRUDER WITH ENHANCED STEAM INJECTION PROPERTIES

(75) Inventors: LaVon Wenger, Sabetha, KS (US); Galen J. Rokey, Sabetha, KS (US); Allan Spellmeier, Fairview, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 1160 days.

This patent is subject to a terminal disclaimer.

(21) Appl. No.: 11/687,439

(22) Filed: Mar. 16, 2007

(65) Prior Publication Data

US 2008/0223223 A1    Sep. 18, 2008

(51) Int. Cl.
*A47J 37/12* (2006.01)
*A23P 1/00* (2006.01)

(52) U.S. Cl. .......... 99/353; 99/447; 99/450.1; 426/510; 426/511; 426/516; 426/519; 426/445

(58) Field of Classification Search ............ 99/447, 99/353, 450.1; 426/510, 511, 516, 519, 523, 426/445–450

See application file for complete search history.

(56) References Cited

U.S. PATENT DOCUMENTS

| | | | | |
|---|---|---|---|---|
| 4,118,164 A | * | 10/1978 | Wenger et al. | 425/202 |
| 4,310,484 A | * | 1/1982 | Blakeslee, III | 264/211.21 |
| 5,120,559 A | | 6/1992 | Rizvi et al. | |
| 5,932,264 A | * | 8/1999 | Hurd et al. | 426/511 |
| 5,965,173 A | * | 10/1999 | Goldup | 425/205 |
| 6,773,739 B2 | * | 8/2004 | Hauck et al. | 426/516 |
| 7,060,788 B2 | * | 6/2006 | Hucks et al. | 528/501 |
| 7,521,076 B1 | * | 4/2009 | Wenger et al. | 426/510 |
| 2010/0062093 A1 | * | 3/2010 | Wenger et al. | 425/113 |

FOREIGN PATENT DOCUMENTS

| | | |
|---|---|---|
| JP | 61285961 | 12/1986 |
| JP | 62272959 | 11/1987 |

* cited by examiner

*Primary Examiner* — Henry Yuen
*Assistant Examiner* — Ket D Dang
(74) *Attorney, Agent, or Firm* — Hovey Williams LLP

(57) ABSTRACT

An improved extruder (10) is provided which permits successful introduction of very high quantities of injected steam into material being processed, on the order of 6-8% or more by weight steam. The extruder (10) includes an elongated extruder barrel (12) having at least one elongated, axially rotatable, helically flighted extrusion screw (16,18) therein. The barrel (12) is equipped with obliquely oriented steam injection ports (44, 46) along the length thereof, housing steam injectors (48, 50). The barrel (12) includes relatively high free volume steam injection heads (32 and 38, 40) having therein screw sections (78, 82) of relatively long pitch length, together with steam restriction heads (30, 34, and 42) on opposite sides of the injection heads (32, and 38, 40) having therein relatively short pitch length screw sections (76, 80, 84).

21 Claims, 1 Drawing Sheet

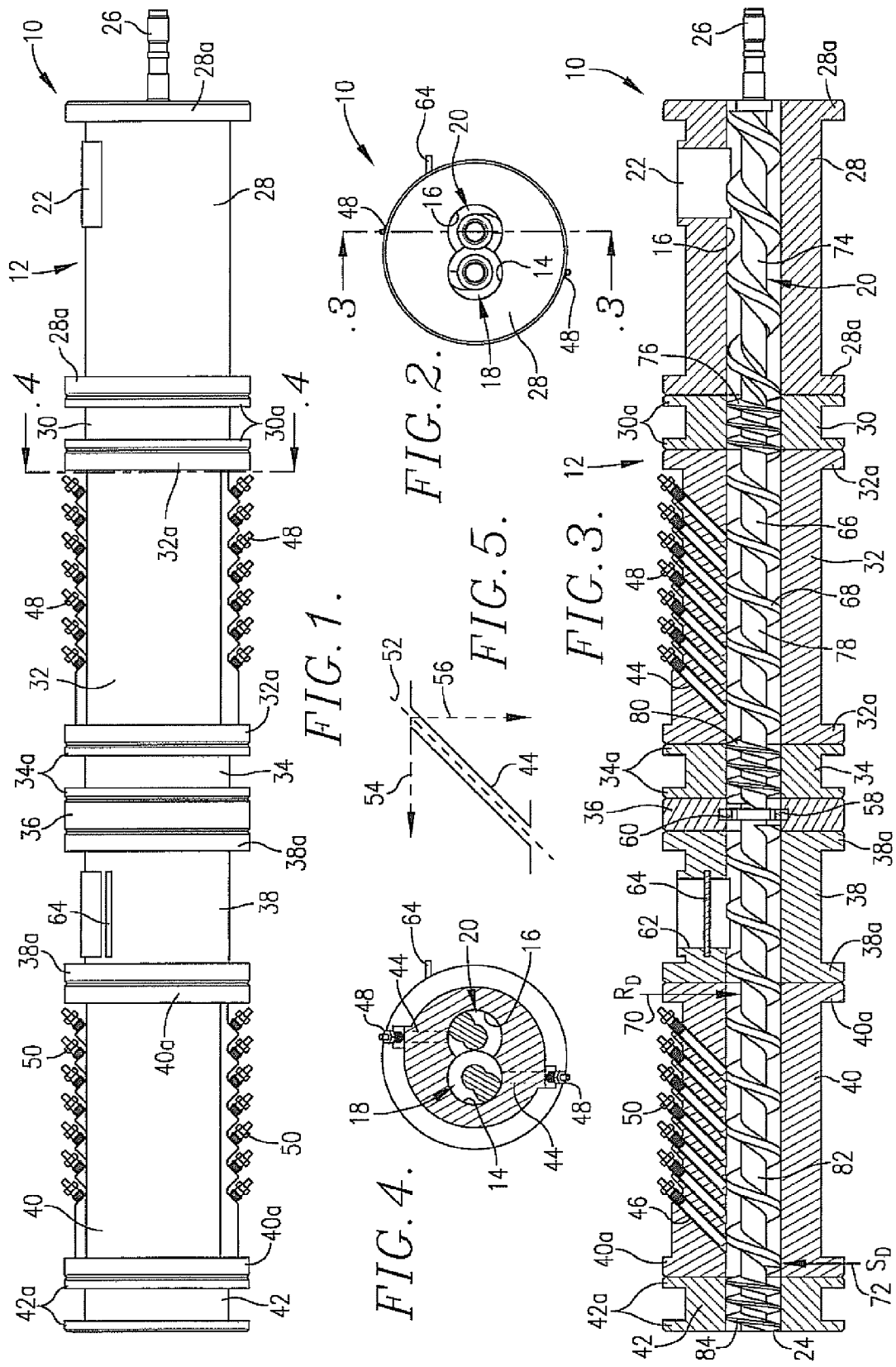

COOKING EXTRUDER WITH ENHANCED STEAM INJECTION PROPERTIES

BACKGROUND OF THE INVENTION

1. Field of the Invention

The present invention is broadly concerned with cooking extruders of the type used for processing materials into animal feeds or human food products. More particularly, it is directed to such cooking extruders which are specifically designed to permit incorporation of very high quantities of steam into materials being processed, which allows the extruders to successfully process feed mixtures containing inexpensive ingredients such as rice bran with less mechanical energy and shear being required.

2. Description of the Prior Art

Extrusion cooking devices are used in a multitude of contexts, e.g., for the fabrication of animal feeds and human food products. Generally speaking, single screw extruders include an elongated barrel having an inlet at one end and an outlet at the other equipped with a restricted orifice die. An elongated, flighted, axially rotatable screw is positioned within the barrel and serves to move material from the inlet toward and through the outlet. Twin screw extruders are also widely used, and include within the extruder barrel a pair of side-by-side, flighted, intermeshed screws. All such extruder devices serve to cook and form initial starting materials into final extruded products. During the course of extrusion the starting materials are subjected to increasing levels of pressure and shear, in order to produce the desired, fully cooked, final extruded products.

In order to achieve higher levels of cook (commonly measured by the degree of gelatinization of starch-bearing ingredients and/or the level of denaturation of proteinacous ingredients), it is common to inject high pressure steam into the extruder barrel for incorporation into the materials being processed. For this purpose, steam injection ports are formed in the extruder barrel and communicate with the interior thereof. The ports are designed to house conventional steam injectors, coupled with steam lines. Without known exception, the injection ports in prior cooking extruders have been oriented in an orthogonal relationship relative to the barrel interior, or perpendicular to the longitudinal axis of the extruder screw(s). However, the extent of possible steam injection with conventional extruder designs is somewhat limited. That is, only about 3-5% by weight steam can be successfully injected and incorporated into the material being processed. If excess steam is injected, it tends to pass directly along the length of the extruder and out the extruder inlet opening (and sometimes the outlet die) without being incorporated into the material being extruded. As such, addition of excess steam serves no useful purpose.

It is known that steam injection to achieve higher levels of cook, thus avoiding the necessity of excess pressure, shear and mechanical working of the material being processed, can be highly advantageous. For example, some aquatic feed products are sensitive to high levels of pressure, shear and mechanical energy, and thus can be adversely affected using conventional extruders. Additionally, these feeds sometimes make use of relatively inexpensive ingredients such as rice bran, which are best processed using high steam injection levels.

Accordingly, there is a real need in the art for improved cooking extruder devices which can be used to inject greater quantities of steam into the material being processed, as compared with conventional extruder designs.

SUMMARY OF THE INVENTION

The present invention overcomes the problems outlined above and provides improved cooking extruders capable of successfully incorporating relatively high quantities of steam into material being processed therein. Broadly speaking, the cooking extruders of the invention comprise an elongated, tubular barrel having an inlet, an outlet spaced from the inlet, and an elongated bore extending between the inlet and outlet and presenting a longitudinal axis. At least one elongated, axially rotatable, helically flighted extrusion screw is located within the bore and is operable to convey material from the inlet toward and through the outlet. A plurality of elongated steam injection ports are formed in the barrel between the inlet and the outlet thereof, and communicate with the barrel bore. These ports may be oriented at an oblique angle relative to the barrel longitudinal axis, and preferably in a direction toward the barrel outlet.

In further preferred aspects of the invention, the extruder barrel and screw(s) are cooperatively formed to present injection zones adjacent the steam injection ports, with steam flow-restricting zones on opposite sides of the injection zones. The injection zones are characterized by relatively smaller barrel fills (i.e., the extent of the free volume within the barrel occupied by material being processed) and long pitch length screw sections, whereas the restriction zones have larger barrel fills and significantly shorter pitch length screw sections. As such, the steam injected into the injection zones can be incorporated into the material being processed, while the restriction zones serve to inhibit the axial flow of the injected steam toward the barrel inlet or outlet.

In practice, it has been found that the extruders of the invention can be used to inject at least about 6%, more preferably at least about 8%, and commonly from about 6-8% weight steam into the material being processed, thus achieving the principal aim of the invention.

BRIEF DESCRIPTION OF THE DRAWINGS

FIG. 1 is a side elevational view of a cooking extruder in accordance with the invention, equipped with obliquely oriented steam injection ports and injectors;

FIG. 2 is a front end view of the cooking extruder depicted in FIG. 1;

FIG. 3 is a vertical sectional view taken along line 3-3 of FIG. 2;

FIG. 4 is a vertical sectional view taken along line 4-4 of FIG. 1; and

FIG. 5 is a schematic illustration of an orthogonal resolution of the longitudinal axis of one of the extruder barrel injection ports, illustrating the resolution components.

DETAILED DESCRIPTION OF THE PREFERRED EMBODIMENT

Turning now to the drawing, a cooking extruder 10 in accordance with the invention includes an elongated, tubular, multiple-section barrel 12 presenting juxtaposed, intercommunicated chambers or bores 14, 16, and a pair of elongated, helically flighted, axially rotatable, juxtaposed, intercalated screws 18 and 20 within the bores 14, 16. The barrel 12 includes an inlet 22 and a spaced outlet 24 which communicate with the bores 14, 16. Although not shown, it will be appreciated that a restricted orifice die is normally positioned across outlet 24 for extrusion purposes. Additionally, the drive ends 26 of the screws 18, 20 are operably coupled with a drive assembly (not shown) for axially rotation of the screws 18, 20, which typically includes a drive motor and gear reduction assembly.

In more detail, the barrel 12 includes, from right to left in FIGS. 1 and 3, a series of tubular sections connected end-to-end by conventional bolts or other fasteners. Specifically, the barrel 12 has an inlet head 28, a first short steam restriction head 30, a first steam injection head 32, a second short steam restriction head 34, a mid-barrel adjustable valve assembly head 36, an adjustable steam outlet head 38, a second steam injection head 40, and third short steam restriction head 42. As illustrated, each of the heads 28-34 and 38-42 is equipped with endmost, radially enlarged connection flanges 28a-34a and 38a-42a, and all of the heads 28-42 have aligned through-bores which cooperatively form the barrel bores 14 and 16. The head 36 likewise has through bores mating with those of flanges 32a and 38a.

The heads 32 and 40 of barrel 12 are each equipped with two series of steam injection ports 44 or 46, wherein each of the ports houses an elongated steam injector 48 or 50. The two series of ports 44 in head 32 are located so as to respectively communicate with the bores 14 and 16 of the head (see FIG. 4). Similarly, the two series of ports 46 in head 40 also respectively communicate with the bores 14 and 16 of this head.

Importantly, the ports 44 and 46 are oriented at oblique angles relative to the longitudinal axes of the corresponding bores 14 and 16. In practice, the ports are oriented at an angle from about 30-85 degrees, more preferably from about 30-60 degrees and most preferably about 45 degrees, relative to these axes. Moreover, the ports 44, 46 are preferably oriented in a direction toward the outlet 24. More specifically, and referring to FIG. 5, it will be seen that each representative port 44 presents a longitudinal axis 52. If this axis 52 is orthogonally resolved into components 54 and 56, the component 54 extends in a direction toward outlet 24.

The mid-barrel adjustable valve assembly head 36 is of the type described in U.S. patent application Ser. No. 11/279,379, filed Apr. 11, 2006 and incorporated by reference herein. Briefly, the head 36 includes opposed, slidable, flow restriction components 58 and 60, which can be selectively adjusted toward and away from the central shafts of the extruder screws 18 and 20, so as to vary the restriction upon material flow and thus increase pressure and shear within the extruder 10. On the other hand, the steam outlet head 38 has a steam outlet 62 with an adjustable cover 64 permitting selective escape of steam during the course of extrusion. In some instances, a vacuum device (not shown) can be used in lieu of cover 64 for more effective withdrawal of steam and/or reduction in processing pressures.

The screws 18 and 20 are identical to each other, and thus only one of the screws need be described in detail. Referring to FIG. 3, it will be seen that the overall screw 20 broadly includes a central shaft 66 with helical flighting 68 projecting outwardly from the shaft 66. However, the screw 20 is specially designed and has a number of novel features. These features are best described by a consideration of certain geometrical features of the screw 20 and its relationship to the associated bore 16. In particular, the shaft 66 has a root diameter $R_D$ defined by the arrow 70 of FIG. 3, as well as an outermost screw diameter $S_D$ defined by the screw flighting 68 and illustrated by arrow 72. In preferred practice, the ratio $S_D/R_D$ of the outermost screw diameter to the root diameter is from about 1.9-2.5, and most preferably about 2.35.

The individual sections of the screw flighting 68 also have different pitch lengths along screw 20, which are important for reasons described below. Additionally, along certain sections of screw 20, there are different free volumes within the bore 16, i.e., the total bore volume in a section less the volume occupied by the screw within that section differs along the length of the screw 20.

In greater detail, the screw 20 includes an inlet feed section 74, a first short pitch length restriction section 76 within head 30, a first longer pitch length section 78 within head 32, a second short pitch length restriction section 80 within head 34, a second longer pitch length section 82 within heads 38 and 40, and a third short pitch length restriction section 84 within head 42. It will thus be seen that the pitch lengths of screw flighting 68 of screw sections 76, 80, and 84 are substantially smaller than the corresponding pitch lengths of the flighting 68 of the screw sections 78 and 82. In preferred practice, the pitch lengths of screw sections 76, 80, and 84 range from about 0.25-1.0 screw diameters, and are most preferably about 0.33 screw diameters. The pitch lengths of 78 and 82 range from about 1-2 screw diameters, and are more preferably about 1.5 screw diameters.

These geometrical features are important in achieving the ends of the invention, and specifically permit incorporation of significantly greater amounts of steam into the material passing through extruder 10, as compared with conventional designs. In essence, the restriction heads 30 and 34, and 34 and 42, together with the short pitch length screw section 76, 80 and 84 therein, cooperatively create steam flow restriction zones which inhibit the passage of injected steam past these zones. As such, the zones are a form of steam locks. Additionally, provision of the heads 32, 38, and 40 with the longer pitch length screw sections 78 and 82 therein, between the restriction zones, creates steam injection zones allowing injection of greater quantities of steam than heretofore possible. The longer pitch screw sections 78 and 82 result in decreased barrel fill (not necessarily greater free volume), and thus create steam injection zones. Finally, the orientation of the injection ports 44 and 46, and the corresponding injectors 48 and 50 therein, further enhances the incorporation of steam into the material passing through extruder 10.

This combination of factors within extruder 10 allows significantly greater steam to be injected, as compared with conventional extruder design. In the later case, only about 3-5% steam may be injected, with any excess simply passing through the extruder and exiting the barrel inlet. However, in the present invention, about 6-8% or more by weight steam may be successfully injected without undue injected steam loss, based upon total weight of dry material (i.e., the total weight of the dry ingredients containing only native water, less any water normally added to the dry ingredients prior to passage thereof into the extruder) within the barrel 12 at any instance taken as 100% by weight. This is particularly important in the case of certain animal feeds which are improved by additional cooking within the extruder without imposition of excessive shear and mechanical energy cooking.

Although the extruder 10 illustrated in the Figures includes the use of an adjustable valve assembly head 36 and steam outlet head 38, the use of such heads is not required. The head 36 can advantageously be used as a further restriction against steam loss, and the head 38 can be used in instances where mid-barrel steam venting is desired, e.g., where denser products are desired.

Furthermore, while the illustrated embodiment is in the form of a twin screw extruder, it will be understood that the principles and constructional features of the invention may be used in the context of single screw extruders as well.

Finally, the extruders of the invention are cooking extruders, which are designed to at least partially or fully cook material passing there through, while also forming the material into discrete shapes. As such, the extruders are equipped with screws which impart shear and mechanical energy as a part of the cooking process, which is augmented by steam injection. Further, although not shown, such cooking extruder barrels may be equipped with external jackets for introduction of heat exchange media to indirectly heat or cool the material passing through the extruders.

We claim:

1. A cooking extruder comprising:
   an elongated, tubular barrel having an inlet, an outlet spaced from said inlet, and an elongated bore extending between the inlet and outlet and presenting a longitudinal axis;
   at least one elongated, axially rotatable, helically flighted extrusion screw located within said bore and operable to convey material from said inlet toward and through said outlet;
   a plurality of elongated steam injection ports formed in said barrel between said inlet and said outlet and communicating with said bore at respective steam injection points, said ports being oriented at an oblique angle relative to said longitudinal axis; and
   a restricted orifice die adjacent said barrel outlet,
   said screw having a first section adjacent said ports with a first screw fighting pitch length, and second screw sections on opposite ends of said first section, said second screw sections being axially spaced from said steam injection points and having second fighting pitch lengths, said first screw fighting pitch length being greater than said second screw fighting pitch lengths.

2. The extruder of claim 1, said barrel having a pair of juxtaposed, elongated chambers, with a pair of elongated, juxtaposed, intercalated extrusion screws respectively located within the chambers of said barrel, there being a separate series of said injection ports communicating with each of said barrel chambers.

3. The extruder of claim 1, said ports being oriented at an angle of from about 30-85 degrees relative to said longitudinal axis.

4. The extruder of claim 1, said first screw fighting pitch length being from about 1-2 screw diameters, and said second screw flighting pitch lengths being from about 0.25-1.0 screw diameters.

5. The extruder of claim 1, the second screw sections operable to at least partially restrict the flow of steam therepast.

6. The extruder of claim 1, the barrel fill within said barrel in the region of said first screw section being less than the barrel fill within said barrel in the regions of said second screw sections.

7. The extruder of claim 1, said screw having a ratio of screw flight diameter to root diameter of from about 1.9-2.5.

8. A method of extruding an initially dry material through a cooking extruder having an elongated, tubular barrel having an inlet and an outlet and presenting a longitudinal axis, an elongated, axially rotatable, helically flighted screw within said barrel, and a restricted orifice die adjacent said outlet, said material having a dry weight, said method comprising the steps of:
   passing said material into said barrel inlet, and conveying said material along the length thereof toward and through said outlet and said die;
   during said passage of said material through the barrel, injecting steam into said barrel at an area between said inlet and said outlet and at an oblique angle relative to said longitudinal axis, and causing said injected steam to mix with said material; and
   creating a steam injection zone adjacent said steam injection area having a first level of barrel fill of material therein, and steam flow-restricting zones on opposite sides of said steam injection zone having a second level of barrel fill of material therein, said second level of barrel fill being greater than said first level of barrel fill, with the free volume in said steam injection zone being greater than the free volumes in said steam flow-restricting zones, in order to permit injection of steam into said steam injection zone with restriction of steam flow passed said steam-flow restricting zones.

9. The method of claim 8, said barrel having a pair of juxtaposed, elongated chambers, with a pair of elongated, juxtaposed, intercalated extrusion screws respectively located within the chambers of said barrel, there being a separate series of said injection ports communicating with each of said barrel chambers.

10. The method of claim 8, said ports being oriented at an angle of from about 30-60 degrees relative to said longitudinal axis.

11. The method of claim 8, including the step of injecting from at least about 6% by weight of steam into said material, based upon said weight of dry material within said barrel taken as 100% by weight.

12. A cooking extruder comprising:
   an elongated, tubular barrel having an inlet, an outlet spaced from said inlet, and an elongated bore extending between the inlet and outlet and presenting a longitudinal axis;
   at least one elongated, axially rotatable, helically flighted extrusion screw located within said bore and operable to convey material from said inlet toward and through said outlet;
   a plurality of elongated steam injection ports formed in said barrel between said inlet and said outlet and communicating with said bore at respective steam injection points; and
   a restricted orifice die adjacent said barrel outlet,
   said screw having a first section adjacent said ports with a first screw flighting pitch length, and second screw sections on opposite ends of said first section, said second screw sections being axially spaced from said steam injection points and having second flighting pitch lengths, said first screw fighting pitch length being greater than said second screw fighting pitch lengths, the volume within said barrel unoccupied by said first screw section defining a free volume.

13. The extruder of claim 12, said first screw fighting pitch length being from about 1-2 screw diameters, and said second screw fighting pitch lengths from about 0.25-1 screw diameters.

14. The extruder of claim 12, said second screw sections operable to at least partially restrict the flow of steam therepast.

15. The extruder of claim 12, the free volume within said barrel in the region of said first screw section being greater than the free volume within said barrel in the regions of said second screw sections.

16. The extruder of claim 12, said screw having a ratio of screw flight diameter to root diameter of from about 1.9-2.5.

17. An extruder screw, comprising:
   an elongated shaft;
   helical flighting on said shaft and extending along the length thereof, said flighting presenting a pair of spaced apart short pitch length sections and a long pitch length section between said pair of short pitch length sections, said short pitch length sections each having a pitch length of from about 0.25-1.0 screw diameters, and said long pitch length section having a pitch length of from about 1-2 screw diameters.

18. The extruder screw of claim 17, said screw having a ratio of flight diameter to root diameter of from about 1.9-2.5.

19. The extruder screw of claim 17, each of said short pitch length sections having a pitch length of about 0.33 screw diameters, and said long pitch length sections having a pitch length of about 1.5 screw diameters.

20. The extruder screw of claim 17, a free volume defined by said long pitch length section being greater than the free volumes of either of said short pitch length sections.

21. The extruder screw of claim 17, said long pitch length section having a length greater than the lengths of either of said short pitch length sections.

* * * * *

UNITED STATES PATENT AND TRADEMARK OFFICE
CERTIFICATE OF CORRECTION

PATENT NO. : 7,987,774 B2
APPLICATION NO. : 11/687439
DATED : August 2, 2011
INVENTOR(S) : LaVon Wenger et al.

Page 1 of 1

It is certified that error appears in the above-identified patent and that said Letters Patent is hereby corrected as shown below:

In the Claims

In Claim 1, Column 5, lines 29, 32, 33, and 34, cancel "fighting" and insert --flighting--.

In Claim 4, Column 5, line 44, cancel "fighting" and insert --flighting--.

In Claim 12, Column 6, lines 47 and 48, cancel "fighting" and insert --flighting--.

In Claim 13, Column 6, lines 51 and 53, cancel "fighting" and insert --flighting--.

Signed and Sealed this
Nineteenth Day of August, 2014

Michelle K. Lee
*Deputy Director of the United States Patent and Trademark Office*